US012611940B2

(12) United States Patent
Huang et al.

(10) Patent No.: US 12,611,940 B2
(45) Date of Patent: Apr. 28, 2026

(54) ELECTRIC VEHICLE SYSTEMS AND METHODS FOR DRIVING VEHICLES

(71) Applicant: GIANT MANUFACTURING CO., LTD., Taichung City (TW)

(72) Inventors: Chin-Lai Huang, Hsinchu City (TW); Hsiao-Wen Hsu, Taichung City (TW); Sheng-Ho Hsu, Taichung City (TW)

(73) Assignee: GIANT MANUFACTURING CO., LTD., Taichung City (TW)

( * ) Notice: Subject to any disclaimer, the term of this patent is extended or adjusted under 35 U.S.C. 154(b) by 1002 days.

(21) Appl. No.: 17/371,933

(22) Filed: Jul. 9, 2021

(65) Prior Publication Data

US 2022/0016984 A1     Jan. 20, 2022

Related U.S. Application Data

(60) Provisional application No. 63/052,657, filed on Jul. 16, 2020.

(51) Int. Cl.
| | |
|---|---|
| *B60L 15/20* | (2006.01) |
| *B62M 6/50* | (2010.01) |
| *B62M 6/55* | (2010.01) |

(52) U.S. Cl.
CPC ............... *B60L 15/20* (2013.01); *B62M 6/50* (2013.01); *B62M 6/55* (2013.01); *B60L 2200/12* (2013.01)

(58) Field of Classification Search
CPC .............................. B60L 2200/12; B60L 15/20
See application file for complete search history.

(56) References Cited

U.S. PATENT DOCUMENTS

| | | | |
|---|---|---|---|
| 2011/0001442 A1* | 1/2011 | Lee ........................ | H02J 7/1423 |
| | | | 320/117 |
| 2012/0202649 A1 | 8/2012 | Huber | |
| 2013/0311019 A1* | 11/2013 | Tanaka ..................... | B62M 6/45 |
| | | | 701/22 |
| 2014/0353055 A1 | 12/2014 | Kronfeld et al. | |
| 2015/0136509 A1* | 5/2015 | Tanaka .................... | B60L 15/20 |
| | | | 180/206.3 |

(Continued)

FOREIGN PATENT DOCUMENTS

| | | |
|---|---|---|
| CN | 1104974 A | 7/1995 |
| CN | 1268517 C | 8/2006 |

(Continued)

OTHER PUBLICATIONS

International Search Report and Written Opinion issued in related PCT Application No. PCT/CN2021/106584, mailed Sep. 28, 2021 (9 pgs.).

*Primary Examiner* — Imran K Mustafa
(74) *Attorney, Agent, or Firm* — Finnegan, Henderson, Farabow, Garrett & Dunner, L.L.P.

(57) ABSTRACT

An electric vehicle includes a frame, at least one front wheel and at least one rear wheel coupled to the frame, one or more pedals coupled to the frame and configured for a user's engagement via pedaling, and a controller configured to output one or more driving signals in response to the pedaling of the one or more pedals. The electric vehicle also includes a first motor coupled to and configured to drive one of the front and rear wheels, and a first driver coupled with the first motor and configured to adjust the output to the first motor in response to the one or more driving signals.

10 Claims, 7 Drawing Sheets

100

(56)  References Cited

U.S. PATENT DOCUMENTS

| | | | |
|---|---|---|---|
| 2016/0144928 A1 | 5/2016 | Chun | |
| 2018/0370593 A1* | 12/2018 | Park | B60L 7/18 |
| 2022/0212751 A1* | 7/2022 | Tsukamoto | B62M 6/55 |

FOREIGN PATENT DOCUMENTS

| | | |
|---|---|---|
| CN | 203581296 U | 5/2014 |
| CN | 204688339 U | 10/2015 |
| CN | 105270559 A | 1/2016 |
| CN | 106976522 A | 7/2017 |
| EP | 2384923 A1 | 11/2011 |
| JP | 2011-235883 A | 11/2011 |
| JP | 2012-197038 A | 10/2012 |
| JP | 2013-216176 A | 10/2013 |
| JP | 2014-064423 A | 4/2014 |
| JP | 2015-098227 A | 5/2015 |
| JP | 2019166914 A | 10/2019 |
| KR | 2012-0001834 A | 1/2012 |
| TW | 201524800 A | 7/2015 |
| TW | I 549859 B | 9/2016 |
| TW | 201736187 A | 10/2017 |

* cited by examiner

100

130

120

180

170

110

190

150

140

160

400

450

420

480

410

470

440

430

460

490

700

ELECTRIC VEHICLE SYSTEMS AND METHODS FOR DRIVING VEHICLES

CROSS-REFERENCE TO RELATED APPLICATIONS

This application is based upon and claims priority to U.S. Provisional Patent Application No. 63/052,657, filed on Jul. 16, 2020, and entitled "ELECTRIC BICYCLES AND SYSTEMS AND METHODS FOR DRIVING BICYCLES OR VEHICLES," which is incorporated herein by reference in its entirety.

TECHNICAL FIELD

The disclosure relates to electric vehicles, and more particularly, to electric bicycles and methods for driving or controlling electric bicycles.

BACKGROUND

Cycling has always been popular for its various roles, including transportations, travels, leisure, exercises, sports, and competitions. Cycling has received wide audience, including users, amateur riders, avid rides, and professional riders and athletes. For example, bicycles are also widely used for both transportation and leisure travel in many cities or regions. In recent years, bike-sharing and related services are becoming popular, and many incentives, programs, and services are organized for providing sustainable and healthy transportations and services.

Most bicycles use chains to drive rear wheels and cables to operate or drive various bicycle components. Functions such as shifting, braking, shocks, and seat adjustments are frequently driven or controlled mechanically. At the same time, there are benefits to deploying electrical components. The alternative of using partial or entirely electrical components may bring one or more benefits or be driven by one or more considerations, such as broadening design choices, expanding design flexibilities, making devices user friendly, enabling by-the-wire, wireless, or remote operations, increasing responsiveness, increasing reliability, reducing overall or repair costs, providing riding or competition flexibilities, and meeting user needs, consumer expectations, or market demands. For example, bicycles powered by electric motors may extend riding distance, time, difficulty, etc., enabling improved cycling experiences to riders at various physical or skill levels, and/or expanding market demands or appeals.

SUMMARY OF THE PRESENT DISCLOSURE

Consistent with some embodiments, an electric vehicle is provided. The electric vehicle includes a frame, at least one front wheel, at least one rear wheel, one or more pedals, a controller, a first motor, and a first driver. The at least one front wheel is coupled to the frame. The at least one rear wheel is coupled to the frame. The one or more pedals are coupled to the frame and configured for a user's engagement with the electric vehicle via pedaling. The controller is configured to output one or more driving signals in response to a pedaling motion of the one or more pedals. The first motor is coupled to one of the at least one front wheel or the at least one rear wheel and configured to drive the one of the at least one front wheel or the at least one rear wheel. The first driver is coupled with the first motor and configured to adjust the first driver's power output to the first motor in response to the one or more driving signals.

Consistent with some embodiments, a method for driving a vehicle is provided. The method includes: sensing, by one or more sensors of the vehicle, data containing information of a rider, a rider's movement, or one or more environmental factors affecting the rider's cycling; receiving, by a processor, the data from the one or more sensors, the data from a driving module of the vehicle, or the data from a memory device of the vehicle or an external database; performing, by the processor, one or more calculations based on one or more of the received data and accordingly outputting a driving signal to one or more drivers; driving, by the one or more drivers, one or more motors based on the driving signal from the processor; and in response to the driving of the one or more drivers, rotating at least one rear wheel or at least one front wheel, by the one or more motors, at a controlled angular velocity corresponding to the driving signal.

Consistent with some embodiments, a non-transitory computer-readable medium is provided. The non-transitory computer-readable medium stores a set of instructions that is executable by a processor of a vehicle to initiate a method for driving the vehicle. The method includes: receiving data from one or more sensors, data from a driving module of the vehicle, or data from a memory device of the vehicle or an external database, the data containing information of a rider, a rider's movement, or one or more environmental factors affecting the rider's cycling; performing one or more calculations based on one or more of the received data and accordingly outputting a driving signal to one or more drivers; and driving one or more motors based on the driving signal from the processor, in which at least one rear wheel or at least one front wheel of the vehicle is rotated by the one or more motors, at a controlled angular velocity corresponding to the driving signal in response to the driving of the one or more drivers.

It is to be understood that the foregoing general descriptions and the following detailed descriptions are exemplary and explanatory only, and are not restrictive of the disclosure, as claimed.

DETAILED DESCRIPTION OF THE DRAWINGS

The accompanying drawings, which are incorporated in and constitute a part of this specification, illustrate several exemplary embodiments and, together with the corresponding descriptions, provide examples for explaining the disclosed embodiment consistent with the present disclosure and related principles. In the drawings.

DETAILED DESCRIPTION

Reference will now be made in detail to exemplary embodiments, examples of which are illustrated in the accompanying drawings and disclosed herein. The implementations set forth in the following description of exemplary embodiments are examples of systems and methods consistent with the aspects related to the disclosure and do not limit the scope of the present disclosure.

Figure 1:
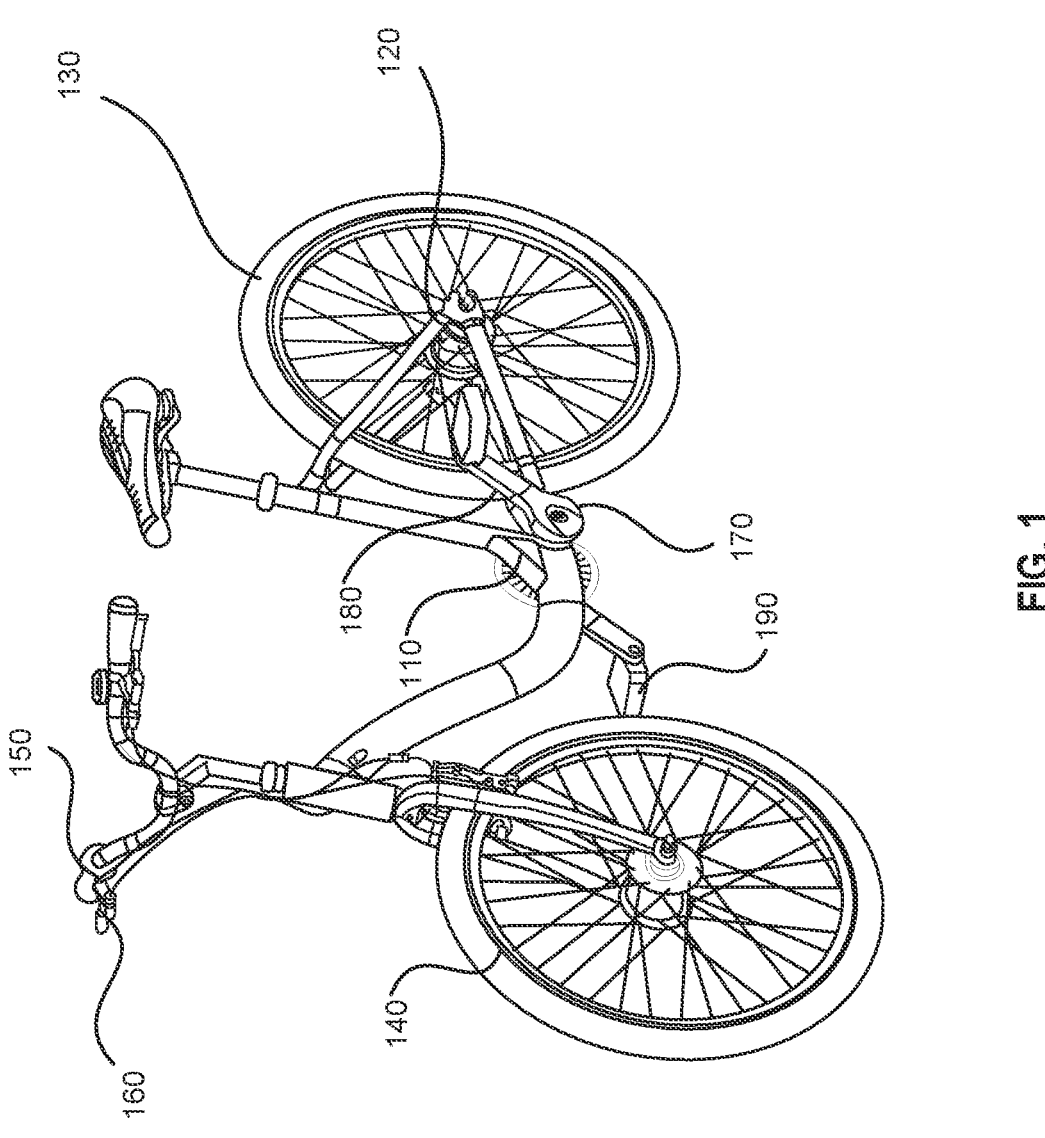
FIG. 1 is a perspective view illustrating an exemplary electric vehicle, consistent with some embodiments of the present disclosure.

FIG. 1 is a perspective view illustrating an electric vehicle 100 consistent with some embodiments of the present disclosure. As shown in FIG. 1, electric vehicle 100 may be an electric bicycle, but the present disclosure is not limited to bicycles and may be similarly applied to other types of vehicles, including vehicles of singe, three, four, or more wheels. In some embodiments, electric vehicle 100 includes an actuating module 110, a driving module 120 communicatively coupled to actuating module 110, at least one rear wheel 130, at least one front wheel 140, a handlebar 150 or device for direction control, one or more front brakes 160 for stopping electric vehicle 100, a bottom bracket or support 170, crank arm(s) 180, and pedal(s) 190 for pedaling. In some embodiments, pedal(s) 190 can be pedaled in one or both directions. Although FIG. 1 illustrates an electric bicycle, a vehicle can be implemented with various variations, structures, and riding positions, etc. For example, the vehicle can be implemented as a unicycle, tricycle, four-wheel cycle, recumbent cycle, etc., and the illustrated components can be adjusted, expanded, or removed as needed.

Actuating module 110 can detect a rider's pedaling and obtain other relevant riding condition information, using one or more internal or external sensors, and accordingly transmitting one or more driving signals to driving module 120. In response to the driving signal(s), driving module 120 can control a motor that drives movement of electric vehicle 100. The driving force can be in a forward or backward direction, and can be applied to rear wheel 130, front wheel 140, or both. As one example of driving module 120, one or more hub motors can be coupled with one or more wheels, with or without gearing or gears within the hub motors, and be configured to provide variable-speed control for electric vehicle 100. In some embodiments, including the one illustrated in FIG. 1, electric vehicle 100 may be implemented without mechanical driving or transmission components between actuating module 110 and either wheel. In other words, mechanical components for transferring power to one or more driving wheels, such as chainring, chain, gear, shifting devices, etc., can be eliminated. The design without mechanical driving/shifting devices may offer one or more advantages, such as reduced weight, less maintenance, lower cost, design flexibility, improved look or style, versatility, etc.

In some embodiments, driving module 120 may also be arranged on front wheel 140, or on both rear wheel 130 and front wheel 140, to control a motor or a hub motor coupled to front wheel 140, or two separate motors respectively coupled to rear wheel 130 and front wheel 140. In some embodiments, driving module 120 can be communicatively coupled to actuating module 110 via wired or wireless communications. Examples of wireless communications may include ANT/ANT+, Bluetooth, ZigBee, Wi-Fi, and UWB (Ultra-Wide Band).

Figure 2:
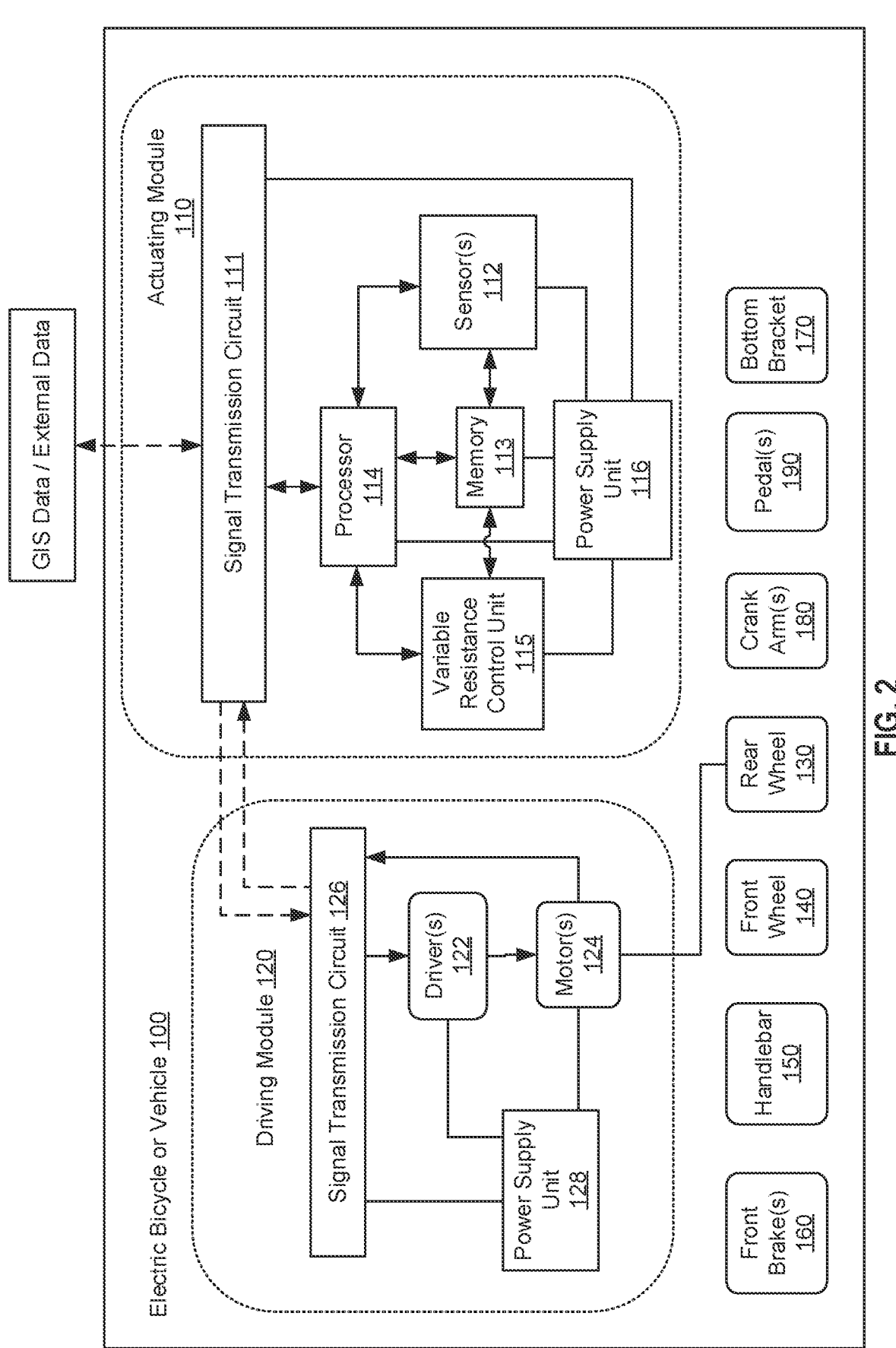
FIG. 2 is a block diagram illustrating exemplary components or functional blocks of an electric vehicle, consistent with some embodiments of the present disclosure.
Figure 3:
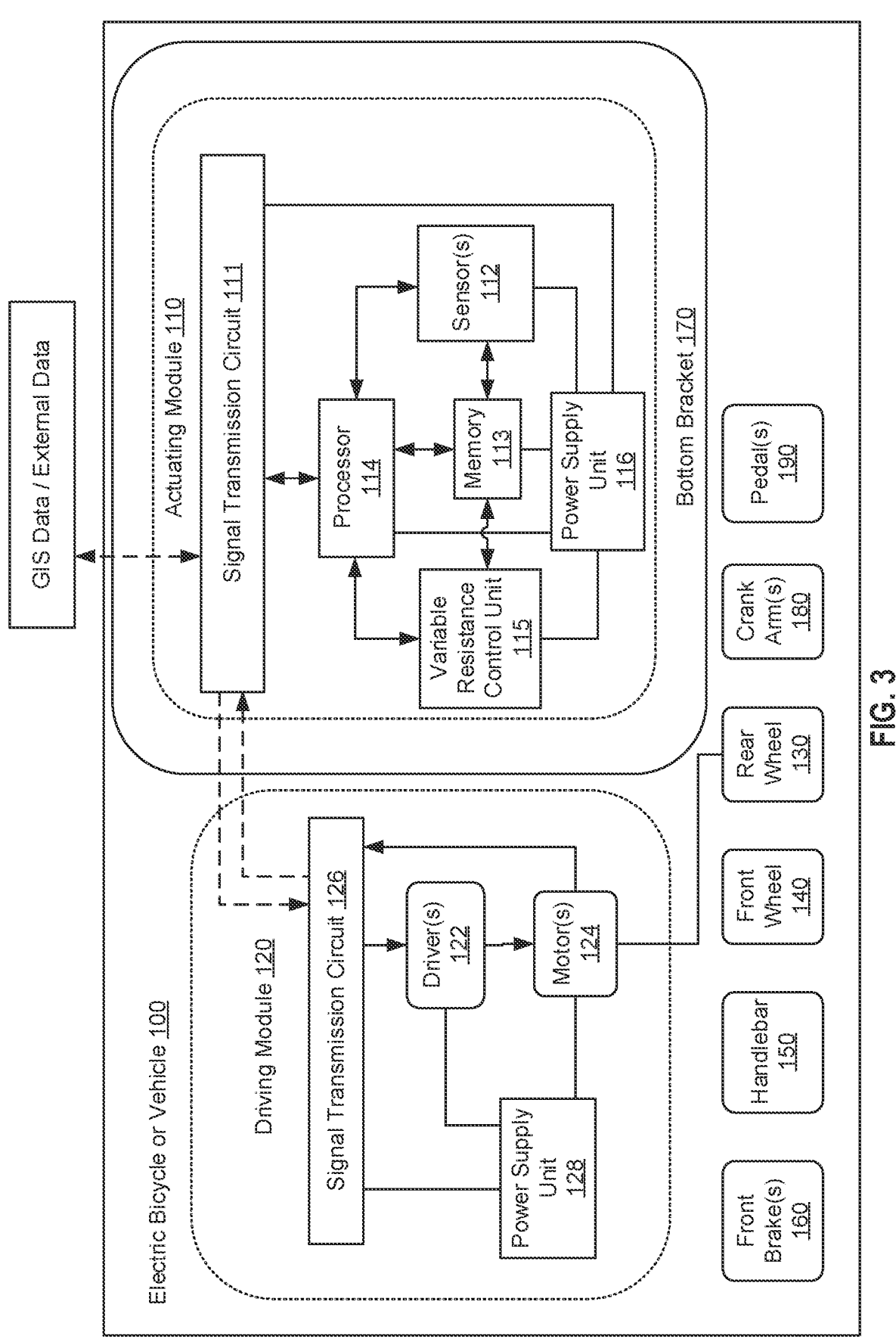
FIG. 3 is a block diagram illustrating exemplary components or functional blocks of an electric vehicle, consistent with some other embodiments of the present disclosure.

FIG. 2 and FIG. 3 are block diagrams illustrating components or functional blocks of electric vehicle 100, consistent with some embodiments of the present disclosure. As shown in FIG. 2, in some embodiments, actuating module 110 may include a signal transmission circuit 111, one or more sensors 112, a memory device 113, a processor 114, a variable resistance control unit 115 and/or a power supply unit 116 configured to supply the operation power to signal transmission circuit 111, sensor(s) 112, memory device 113, processor 114, and/or variable resistance control unit 115. As shown in embodiments of FIG. 3, in some embodiments, actuating module 110 can be arranged within or near bottom bracket 170. Alternatively, in some embodiments, part or all of components in actuating module 110 (e.g., one or more of signal transmission circuit 111, sensor(s) 112, memory device 113, processor 114, variable resistance control unit 115, and power supply unit 116) can be arranged within or near bottom bracket 170, but the present disclosure is not limited thereto. Driving module 120 may include one or more drivers 122, one or more corresponding motors 124 coupled with driver(s) 122, a signal transmission circuit 126 that communicates with the corresponding signal transmission circuit 111 via wired or wireless signals, and a power supply unit 128 configured to supply the operation power to driver(s) 122, motor(s) 124, and/or signal transmission circuit 126.

Memory device 113 can store software instructions executed by processor 114 to perform operations consistent with the disclosed embodiments. For example, processor 114 can be configured to execute a set of instructions stored in memory device 113 to cause a vehicle to perform a method for driving the vehicle (e.g., electric vehicle 100 in FIG. 1 and FIGS. 2-3) when the user pedals on the vehicle, which is discussed in detail below. It will be appreciated that examples described herein are exemplary and other means of establishing communication between signal transmission circuit 111, sensor(s) 112, memory device 113, processor 114, and/or variable resistance control unit 115 may be used. For example, in a networked environment, whether wired or wireless, some of the programmable code, application programs, software instructions, and databases may also be stored in remote computer(s) or cloud server(s). By executing instructions, processor 114 can perform various processing or calculations based on the data from sensor(s) 112.

During the operation of electric vehicle 100, when the rider pedals, processor 114 can receive data associated with information about the rider, the rider's movement, and/or other environmental factors that affect the rider's cycling. For example, sensor(s) 112 may include corresponding sensors configured to sense one or more of the air resistance/wind resistance, the rider's and/or bicycle's weight, the current slope or grade, the rider's feet position on pedal(s) 190, the cadence (or pedaling rate), the pedaling force (or the effective pedaling power), the bike speed, or any other suitable data. In some embodiments, sensor(s) 112 can include one or more of a wind resistance sensor, a proximity sensor (e.g., an infra-red sensor), a weight sensor, a pressure sensor, a cadence sensor, a speed sensor, a power sensor (e.g., a power meter), an image sensor, a position sensor, a motion sensor (e.g., an inertial measurement unit (IMU)), or other sensors to detect physical and/or electrical characteristics in actuating module 110, etc. Sensor(s) 112 can be integrated or mounted on respective locations on electric vehicle 100, or, as appropriate mounted on the rider riding on electric vehicle 100. For example, the motion sensor can include a rider body-mounted IMU.

In some embodiments, processor 114 can receive data associated with relevant information through signal transmission circuit 111 from driving module 120 or from external sensors or databases via wired or wireless communications. For example, processor 114 can receive geographic information system (GIS) data from a GIS database via a wireless communication. In addition, processor 114 can receive a rotation speed of motor(s) 124 or the bike speed sensed in driving module 120 through signal transmission circuits 111 and 126. In addition, processor 114 can also retrieve data stored in memory device 113. For example, memory device 113 may store historical sensor data, GIS data, or other rider's personal information, such as the rider's weights or personalized riding preferences.

According to the received data discussed above, processor 114 can control or drive electric vehicle 100 based on the rider's current cycling condition and the environmental factors, such as the wind speed and the current slope or grade. Accordingly, processor 114 can send corresponding driving signal(s) to driver(s) 122 in driving module 120, through signal transmission circuits 111 and 126, to provide the driving command to accelerate, decelerate, or terminate the rotation of motor(s) 124 accordingly. The control or driving of electric vehicle 100 can be done with software, with algorithms, with machine learning, or with any such combination. The control strategy may change for different riders, different riding habits, different riding or commute routes, pedaling power and/or speed, remaining battery power, riding and weather conditions, etc.

In some embodiments, variable resistance control unit 115 is communicatively connected to processor 114, via wired or wireless communications means and controlled by operations of processor 114. Variable resistance control unit 115 can engage with or mounted in bottom bracket 170 or another portion of the supporting structure or frame of electric vehicle 100. Variable resistance control unit 115 can provide variable effective rolling resistance for the pedaling based on one or more command signals received from processor 114. Accordingly, when the rider is pedaling, variable resistance control unit 115 can provide pedaling feedback, and adaptive feedback may be adjusted or controlled to simulate or effect different riding experiences.

For example, variable resistance control unit 115 may include a hysteresis resistance generating module having an inner magnetic stationary member and an outer magnetic stationary member, a semi-hard magnetic rotating member between the inner magnetic stationary member and the outer magnetic stationary member, and a conductive coil. The conductive coil receives the command signal(s) from processor 114 and the electric power from power supply unit 116, and senses opposite magnetisms that the inner magnetic stationary member and the outer magnetic stationary member generate. Accordingly, the semi-hard magnetic rotating member is caused to, in response to hysteresis effects, generate a hysteresis resistance when being rotated.

In some embodiments, power supply unit 116 may include a power generator (e.g., an alternator), a rectifying/regulating circuit (e.g., a circuit including a rectifier, a DC filter, a DC/DC converter, a Pulse Width Modulation (PWM) controller, etc.) coupled with the power generator, and a power storage device (e.g., a battery) coupled with the rectifying/regulating circuit.

When the rider pedals, a rotor part of the power generator connected to the rotation axis is driven and rotates accordingly to generate alternating electrical current (AC) through the motion. The rectifying/regulating circuit rectifies and regulates the generated AC power and transmits the rectified and regulated electric power to the power storage device. The power storage device can supply the power required by electrical components in actuating module 110. For example, the power storage device can provide the electric power to variable resistance control unit 115 in order to generate opposite magnetisms. Thus, the power generated from the rider's pedaling can be converted to the electric power and stored to achieve self-sustainability.

Alternatively, in some embodiments, power supply unit 116 may include a self-powered mechanism. For example, a dynamo or other electricity generating mechanisms can be coupled with bottom bracket 170 and/or pedal(s) 190, such as being installed in or near bottom bracket 170 of electric vehicle 100. When the rider pedals, electricity is generated by the rotational movement or pedaling power at both bottom bracket 170 and crank arm(s) 180, and the generated electricity can be used for supplying the power required by electrical components in actuating module 110 or stored in the battery in power supply unit 116. In some embodiments, power supply unit 116 can also include one or more power conversion circuits, such as DC/DC converter(s) and PWM controller(s), to output power at different voltage, current, or other levels to satisfy power requirements for different electrical components in actuating module 110.

In driving module 120, responsive to the received driving signal(s), driver(s) 122 can be configured to drive motor(s) 124 based on the corresponding driving command for the forward movement of electric vehicle 100, and to accelerate, decelerate, or terminate the rotation of motor(s) 124 correspondingly. By this mechanism, electric vehicle 100 provides an intuitive way to operate electric vehicle 100, which is consistent with the riding experience of cycling a bicycle with mechanical power transmission components. That is, when the cyclist begins to reduce the pedal rate, the rotation speed of motor(s) 124 decreases accordingly to reduce the bike speed, when the cyclist begins to increase the pedal rate, the rotation speed of motor(s) 124 increases accordingly to increase the bike speed, and when the cyclist stops pedaling, the rotation speed of motor(s) 124 may gradually decrease to zero to reduce the bike speed until the bike is stopped. In some other embodiments, the power to the rotation of motor(s) 124 may also be cut off when the cyclist stops pedaling.

In addition, motor(s) 124 and/or corresponding sensor(s), such as a Hall sensor, arranged on motor(s) 124 or on the wheel region in driving module 120 can feedback the rotation speed of motor(s) 124 or the sensed bike speed of electric vehicle 100 to processor 114 through signal transmission circuits 111 and 126. Accordingly, processor 114 can perform a feedback control to adjust rotation speed of motor(s) 124 and the bike speed accordingly.

Similarly, in some embodiments, power supply unit 128 may also include a self-powered mechanism. For example, a dynamo or other electricity generating mechanisms can be installed at front wheel 140. When front wheel 140 rotates, electricity can be generated and used for supplying the power required by electrical components in driving module 120 or stored in the battery in power supply unit 128. In some embodiments, power supply unit 128 can also include one or more power conversion circuits to output power at different voltage levels to satisfy power requirements for different electrical components.

Figure 4:
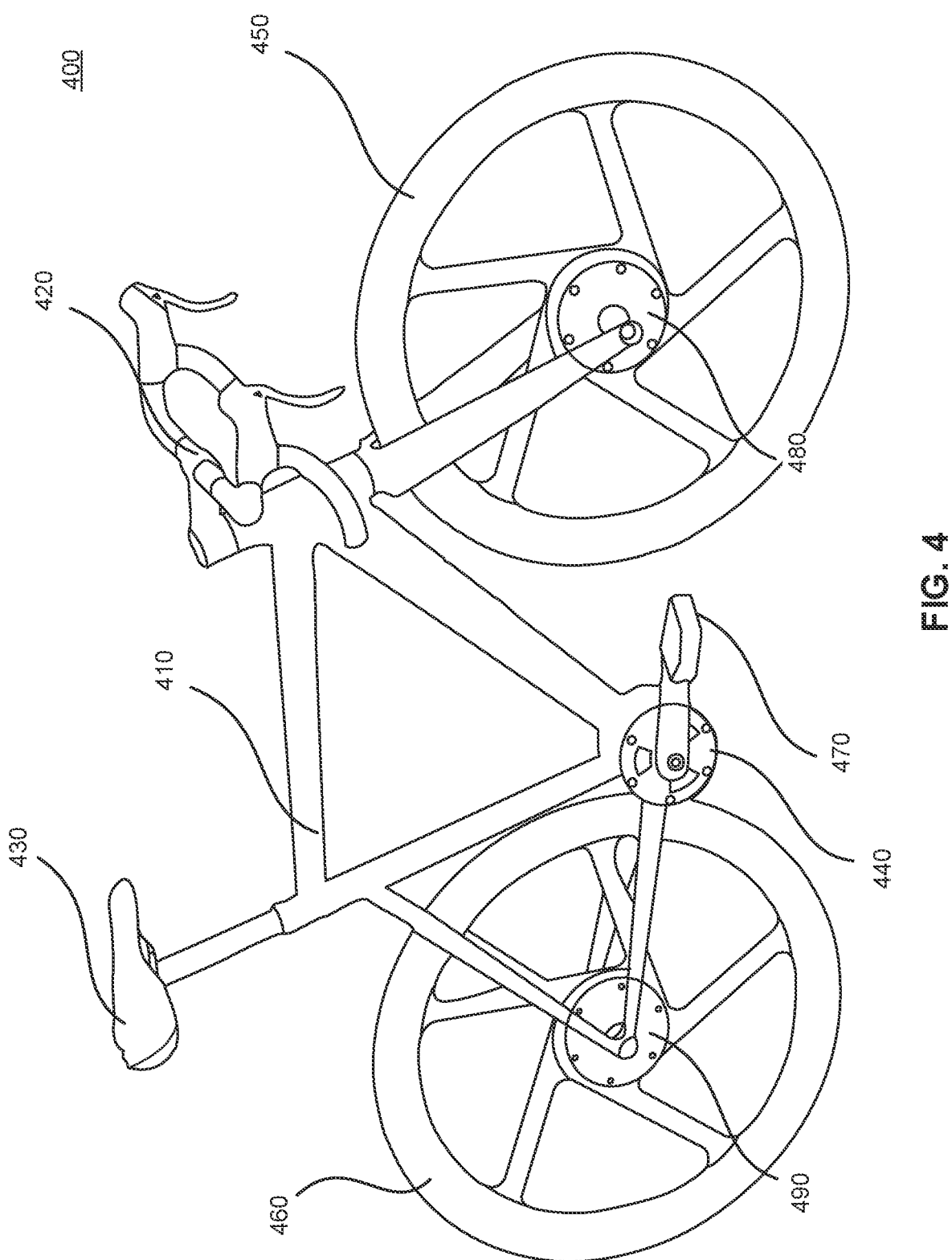
FIG. 4 is a perspective view illustrating another exemplary electric vehicle, consistent with some embodiments of the present disclosure.

Reference is made to FIG. 4, which is a perspective view illustrating an electric vehicle 400, consistent with some embodiments of the present disclosure. As shown in FIG. 4, electric vehicle 400 may be an electric bicycle, but the present disclosure is not limited thereto. In some embodiments, electric vehicle 400 includes a frame 410, a handlebar 420, a seat 430, an electronic throttle ("e-throttle") control module 440, at least one front wheel 450 coupled to the frame, at least one rear wheel 460 coupled to the frame, pedal(s) 470 coupled to the frame via crank arms, a front wheel hub motor 480 coupled to front wheel 450, and a rear wheel hub motor 490 coupled to rear wheel 460.

As shown in FIG. 4, in some embodiments, frame 410 may include a head tube portion, a top tube portion, a down tube portion, a seat tube portion, a seat stay portion, a chain stay portion, and a fork, but the present disclosure is not limited thereto. In various embodiments, frame 410 of electric vehicle 400 may have different designs.

In some embodiments, front wheel hub motor 480 and rear wheel hub motor 490 may be implemented by direct drive hub motors with an operating voltage of 36V and with the rated output power of 250 W and the maximum output power of 500 W. In addition, the rated output speed of front wheel hub motor 480 and of rear wheel hub motor 490 may be 200 RPM and the rated torque of 11.95 Nm. With 700×23 C tires (approximately 700 mm in diameter and approximately 23 mm in tire width) having tire circumference of 2.096 meters, front wheel hub motor 480 and rear wheel hub motor 490 may provide a maximum bike speed of around 25 kilometers per hour (KPH), 20 or 28 mph, or any other speed consistent with country or local regulations and bicycle classifications. It would be appreciated that the operating voltage, the rated power and other parameters provided above are merely by examples and not meant to limit the present disclosure. In various embodiments, different types or models of hub motors or hub or other driving designs can be adopted based on user needs, design considerations, and other factors.

As shown in FIG. 4, handlebar 420 is coupled to a head tube portion of frame 410. Seat 430 is coupled to a seat tube portion of frame 410. E-throttle control module 440 is coupled to a bottom bracket shell connecting to the seat tube portion, chain stay(s), and a down tube portion of frame 410. Pedal(s) 470 are coupled to e-throttle control module 440 and frame 410 via corresponding crank arms and is configured for a user's engagement with electric vehicle 400 via pedaling. Front wheel 450 is supported by a fork of frame 410. Rear wheel 460 is supported by a seat stay portion and a chain stay portion of frame 410. In some embodiments, electric vehicle 400 is a chainless electric bicycle. Front wheel 450 and rear wheel 460 are respectively driven by front wheel hub motor 480 and rear wheel hub motor 490 according to corresponding electronic control signals in response to the pedaling of the rider and/or control signals associated with an electronic shifter ("e-shifter") and an electronic brake ("e-brake") installed on handlebar 420. Alternatively stated, the rotation speed of the hub motors 480 and 490, and the bike speed can be controlled in response to the rider's pedaling and the shift or brake operations performed by the rider by proper electrical command signals.

Figure 5:
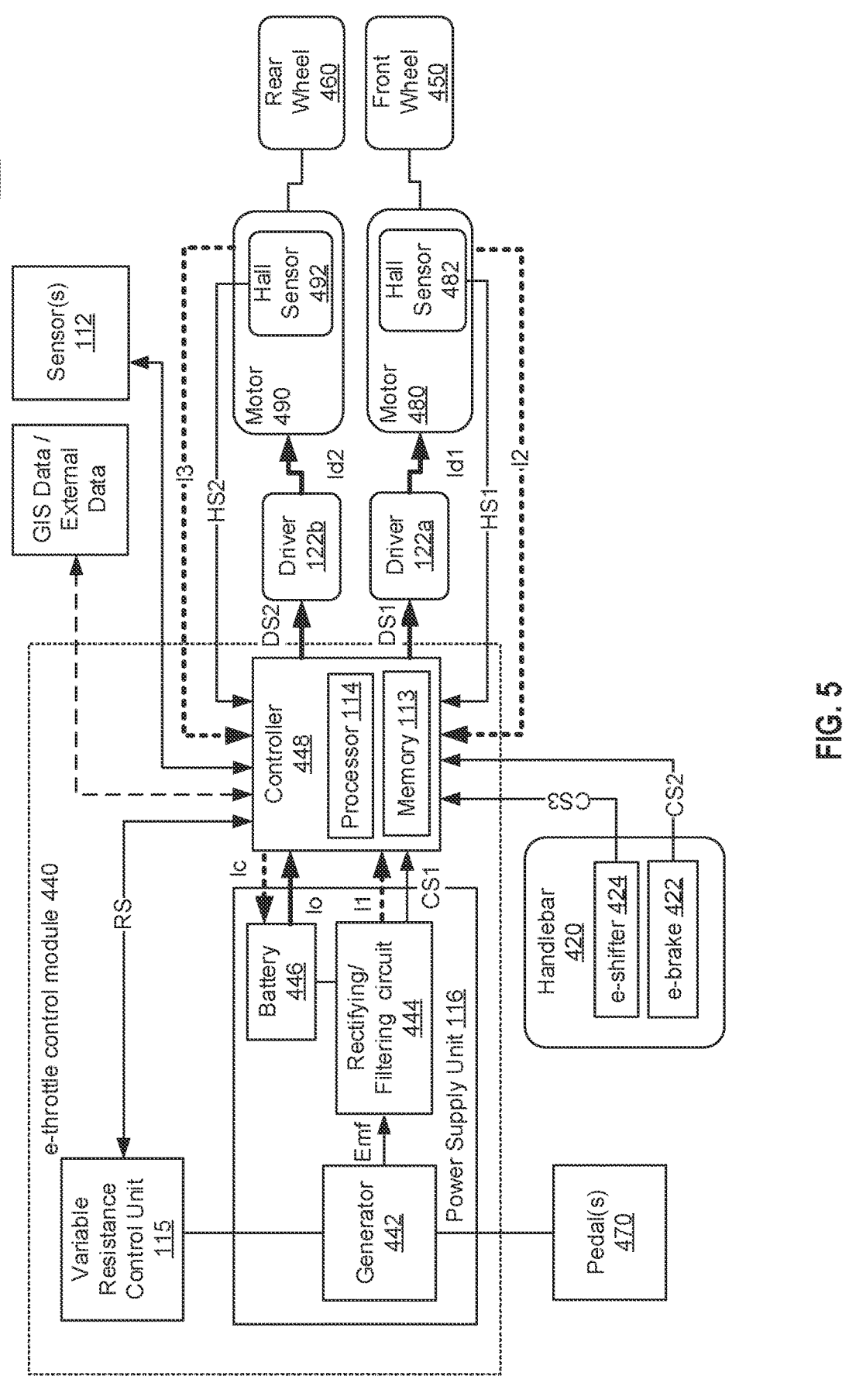
FIG. 5 is a block diagram illustrating the control of hub motors of the electric vehicle shown in FIG. 4, consistent with some embodiments of the present disclosure.

FIG. 5 is a block diagram illustrating the control of hub motors 480 and 490 of electric vehicle 400 shown in FIG. 4, consistent with some embodiments of the present disclosure. As shown in FIG. 5, e-throttle control module 440 may include variable resistance control unit 115 and power supply unit 116, examples of which are also illustrated in FIG. 2 and FIG. 3, and a motor controller 448. In some embodiments, motor controller 448 can also be implemented by memory device 113 and processor 114 shown in FIG. 2. Similar to the embodiments shown in FIG. 2, memory device 113 can store software instructions executed by processor 114 to perform operations consistent with the disclosed embodiments. For example, processor 114 can be configured to execute a set of instructions stored in memory device 113 to cause a vehicle to perform a method for driving the vehicle (e.g., electric vehicle 400 in FIG. 4) when the user pedals on the vehicle by outputting driving signals to corresponding drivers 122a and 122b, which is discussed in detail below.

Particularly, in the embodiments of FIG. 5, power supply unit 116 may include a power generator 442 (e.g., a dc motor, a generator, or an alternator), a rectifying/regulating circuit 444 (e.g., a circuit including a rectifier, a DC filter, a DC/DC converter, a Pulse Width Modulation (PWM) controller, etc.) coupled with power generator 442, and a power storage device 446 (e.g., a battery) coupled with rectifying/regulating circuit 444. For example, power generator 442 may be a generator with a rated output power of 500 W. Power storage device 446 may include one or more Lithium battery pack with an output voltage of 36V and a rated capacity of 10 Ah, but the present disclosure is not limited thereto. When a user is pedaling on pedals 470, power generated by pedaling can be converted from mechanical to electrical energy by power generator 442. Accordingly, power generator 442 is configured to generate a corresponding back emf signal Emf to rectifying/regulating circuit 444.

After the signal processing performed by the rectifying/regulating circuit 444, a pedaling command signal CS1 being associated with the back emf signal Emf is outputted to motor controller 448 coupled to power supply unit 116. In some embodiments, motor controller 448 further includes a charging control circuit. When the pedaling speed is sufficient to induce the back emf signal Emf and to generate a charging current I1, the charging current I1 is rectified by rectifying/regulating circuit 444. Accordingly, via the charging control circuit within motor controller 448, a charging current Ic is provided from motor controller 448 to charge power storage device 446.

After receiving pedaling command signal CS1, motor controller 448 is configured to output one or more driving signals DS1, DS2, in response to the pedaling motion of the pedal(s) 470, to corresponding drivers 122a and 122b respectively coupled to front wheel hub motor 480 and rear wheel hub motor 490. Particularly, motor controller 448 may include one or more motor control circuits, such as closed loop torque control circuits and/or closed loop speed control circuits, for generating proper driving signal(s) DS1 and DS2 associated with the received pedaling command signal(s) CS1. Drivers 122a and 122b are configured to receive the driving signal(s) DS1 and DS2, and accordingly output proper driving currents Id1, Id2, in response to the driving signal(s) DS1 and DS2, to front wheel hub motor 480 and rear wheel hub motor 490 to control the rotation speed. Accordingly, front wheel hub motor 480 and rear wheel hub motor 490 are respectively configured to drive front wheel 450 and rear wheel 460 according to driving currents Id1, Id2. Alternatively stated, drivers 122a and 122b are configured to respectively adjust their power output to the hub motors 480 and 490 in response to driving signal(s) DS1 and DS2. In some embodiments, the electricity required for driving hub motors 480 and 490 is also supplied by an output current Io provided by power storage device 446 to motor controller 448.

As shown in FIG. 5, in some embodiments, hub motors 480 and 490 respectively include Hall sensors 482 and 492 configured to detect a rotation angle, such as from 0 to 360 degrees, of hub motors 480 and 490, and the sensed information may be used for further control, monitor, calibration, or other purposes. Hall sensor signals HS1 and HS2 from Hall sensor 482 and 492 are transmitted to motor controller 448 for performing proper motor control. In some embodiments, Hall sensor 482 and 492 can be communicatively coupled to motor controller 448 via wired or wireless communications, such as ANT/ANT+, Bluetooth, ZigBee, Wi-Fi, and/or Ultra-Wide Band (UWB), to transmit Hall sensor signals HS1 and HS2 respectively. In addition, during a downhill ride, hub motors 480 and 490 can be used as generators and generate charging currents I2 and I3 to motor controller 448. Accordingly, via the charging control circuit within motor controller 448, the charging current Ic can be provided from motor controller 448 to charge power storage device 446.

For example, during an uphill ride, hub motors 480 and 490 of electric vehicle 400 operate in a driving mode and function as motors, and need to provide sufficient torque to overcome the resistance and the forces due to gradient, depending on the slope or grade, in order to drive electric vehicle 400. The bike speed may be determined based on the cadence and the current slope or grade when pedaling command signal CS1 is generated within e-throttle control module 440 in response to the rider's pedaling. In some embodiments, driving currents Id1 and Id2 may be adjusted according to detected current slope or grade dynamically during the uphill ride to increase or decrease the torque provided by hub motors 480 and 490 to achieve a constant bike speed, or control the bike speed within a predetermined range, regardless of the slope or grade.

On the other hand, during a downhill ride, usually no pedaling is required. Hub motors 480 and 490 of electric vehicle 400 may operate in a generator mode and function as generators. Driving currents Id1 and Id2 are used to determine the resisting force and the associated output power of the generator. In some embodiments, driving currents Id1 and Id2 may be dynamically adjusted according to slope or grade during a downhill ride, which results in changing the resisting force of hub motors 480 and 490 to achieve a steady or controlled bike speed, or control the bike speed within a predetermined range, regardless of the slope or grade. If the rider pedals during the downhill ride, hub motors 480 and 490 may also be switched back to the driving mode and function as motors in response to the generated pedaling command signal CS1.

In some embodiments, handlebar 420 includes a brake control, e.g., an electronic brake (e-brake) 422 and a shifter, e.g., an electronic shifter (e-shifter) 424. E-brake 422 is also electrically coupled to motor controller 448 and configured to generate a braking signal CS2 when the user pulls the brake lever on handlebar 420. In some embodiments, braking signal CS2 is associated with the amount of braking force desired in response to the user's action. After receiving braking signal CS2 from e-brake 422, motor controller 448 is configured to adjust the outputted driving signal(s) DS1 and DS2 accordingly to reduce the driving currents Id1, Id2, and thus reduce the speed of the bicycle or stop the bicycle, such as reducing it gradually. For example, the max brake torque (at the pedaling cadence of 60 rpm) may be around 32.5 Nm.

Similar to e-brake 422, e-shifter 424 is also electrically coupled to motor controller 448. E-shifter 424 is configured to generate a corresponding shifting signal CS3 when the user triggers the shifter, which may be a wheel with click stops surrounding handlebar 420, a shifting lever arranged on handlebar 420, a thumb shifter, etc. Accordingly, after receiving shifting signal CS3 from e-shifter 424, motor controller 448 is configured to adjust the outputted driving signal(s) DS1 and DS2 accordingly to adjust the driving currents Id1, Id2, and thus change the speed of the bicycle during pedaling. Accordingly, the ratio of the pedaling force to the speed of the bicycle can be adjusted based on the user preference or needs to meet the needs of different cycling scenes. In some embodiments, e-brake 422 and e-shifter 424 can be communicatively coupled to motor controller 448 via wired or wireless communications, such as ANT/ANT+, Bluetooth, ZigBee, Wi-Fi, and/or Ultra-Wide Band (UWB), to transmit braking signal CS2 and shifting signal CS3 respectively.

In some embodiments, motor controller 448 may also perform an automatic shifting according to the current slope or grade. For example, if a rider is riding downhill or uphill, variables such as bicycle speed, torque, and pedaling cadence may also be used as shifting criteria to achieve the automatic shifting. As explained above, motor controller 448 may perform a speed regulation according to the current slope or grade, so that the bike speed is controlled at a constant value or within a predetermined range during the downhill (or uphill) riding. Alternatively stated, motor controller 448 can also be configured to output driving signals DS1, DS2 in response to the riding data detected by sensor(s) 112 coupled to motor controller 448. As discussed above, in some embodiments, motor controller 448 may also receive GIS data from a GIS database or other external data from an external database, via a wireless communication, to output driving signals DS1, DS2 accordingly. The riding data may include the air resistance/wind resistance, the rider's and/or bicycle's weight, the current slope or grade, the rider's feet position on pedal(s), the cadence (or pedaling rate), the pedaling force (or the effective pedaling power), the bike speed, the current battery level or battery health level, other suitable data, or any combination thereof.

In addition, in some embodiments, motor controller 448 can further be configured to output a corresponding resistance command signal RS to variable resistance control unit 115 to increase or decrease the pedaling resistance forces provided by the variable resistance control unit 115. For example, variable resistance control unit 115 may be configured to provide multiple pedaling resistance levels (e.g., from 0 Nm to 34 Nm) in response to the corresponding resistance command signal RS. Accordingly, the variable resistance control unit 115 can provide adaptive feedback and simulate the riding experience in response to different electronic shifting configurations, but the present disclosure is not limited thereto. In some other embodiments, the pedaling resistance forces may remain the same under different electronic shifting configurations. Also, the pedaling resistance forces may be further adjusted based on riding data detected by sensor(s) 112, such as the current slope or grade, the cadence (or pedaling rate), the pedaling force (or the effective pedaling power), the bike speed, or any other suitable data. Motor controller 448 can be configured to calculate a proper pedaling resistance according to the received riding data and/or user's personal preference. Similarly, resistance command signal RS can be transmitted from motor controller 448 to variable resistance control unit 115 via wired or wireless communications.

For example, the user may select a first riding mode (e.g., a simulation mode), so that the user is able to experience certain pedaling resistance, which may simulate or be similar to the force that the user encounters when riding or pedaling a traditional bike (with mechanical transmissions or without motor power). The resistance may also be varied, such as based on the current gear, the current slope or grade, wind, and other considerations. The user may also select, or switch to, a second riding mode (e.g., an auto-adjust mode) different from the first riding mode, so that the pedaling resistance and/or the speed of the bicycle remain the same (or have less variation compared to the cycling on a traditional bike) under different situations. For example, in some embodiments, hub motors 480 and 490 may be controlled and operate at a constant speed or within a predetermined speed range, regardless of the current slope or grade and/or the pedaling power.

Alternatively stated, as long as the user is pedaling, the bicycle is driven by the electricity stored in power storage device 446, in which the speed can be controlled by motor controller 448. In various embodiments, the speed may be determined by one or more of the pedaling speed, one or more riding data (e.g., the current slope or grade, the current battery level, etc.) detected by sensor(s) 112, the shifting level set by e-shifter 424, the braking level set by e-brake 422, or any combination thereof, in response to a selected riding mode or customized setting based on the user's preferences.

In some riding modes, the shifting level can be automatically adjusted by motor controller 448 based on the data sensed by sensor(s) 112 or the GIS Data from a GIS database. For example, sensor(s) 112 may include a power sensor, a cadence sensor, a position sensor, a speed sensor, a motion sensor, an electromyography sensor, a heart rate sensor, a pressure sensor, a respiratory sensor, an inertial measurement unit sensor, or any combination thereof. In some embodiments, one or more physiological parameters, such as oxygen uptake, heart rate, etc., of the rider can be monitored during cycling by corresponding sensor(s) 112. When one or more of the physiological parameters mentioned above are beyond or below a give range, motor controller 448 may switch the shifting level accordingly, and monitor whether the physiological parameter(s) recover to a normal state within a given time. For example, when the detected heart rate (or oxygen uptake) exceeds a safety value, motor controller 448 may adjust the shifting level by sending resistance command signal RS to the variable resistance control unit 115 to change the feedback force to reduce the pedaling resistance engaged with the rider. Therefore, the rider may rest and recover from previous exertion accordingly.

In some other embodiments, sensor(s) 112 may include a pressure sensor arranged on or near seat 430 and configured to detect the weight of the rider. In some other embodiments, sensor(s) 112 may further include or use other types of sensors, such as pressure sensor or tire pressure sensor. In some embodiments, one or more tire pressure sensors, arranged inside at least one tire of the electric bike 400, can be configured to measure the tire pressure and provide occasional or real-time data. Accordingly, motor controller 448 can output corresponding driving signals DS1, DS2 based on the rider's weight or the tire pressure, in order to adjust the amplitude of driving currents Id1, Id2 and provide power output or torque suitable for the rider.

In some other embodiments, motor controller 448 may also adjust the shifting or riding modes, either automatically or based on user settings or preferences, to drive electric vehicle 400 using real-time geographic or other information (e.g., real-time uphill or downhill slope or grade of the road) obtained from the GIS database or based on other external data. Alternatively, motor controller 448 and processor 114 within motor controller 448 can control or drive electric vehicle 400 based on the cycling condition and environmental factors (e.g., weather condition and/or the current slope or grade) obtained from sensor(s) 112 of electric vehicle

400, a remote or cloud database connected wirelessly to electric vehicle 400, or any combination thereof.

In some other embodiments, motor controller 448 may also be configured to monitor the riding conditions and perform a pre-brake operation automatically, without any trigger of e-brake 422 (e.g., via a brake lever), by adjusting a braking level or adjusting the output driving signals DS1, DS2 accordingly when one or more parameters, such as the current slope or grade, bike speed, pedaling cadence, or any combination thereof, exceed a safety value. The motor controller 448 may also be configured to remind or notify the rider to brake to slow down the bike by sending a warning indication to a cycling computer, a smartphone, a wearable device, or any other suitable electronic device, via a wireless communication.

Figure 6:
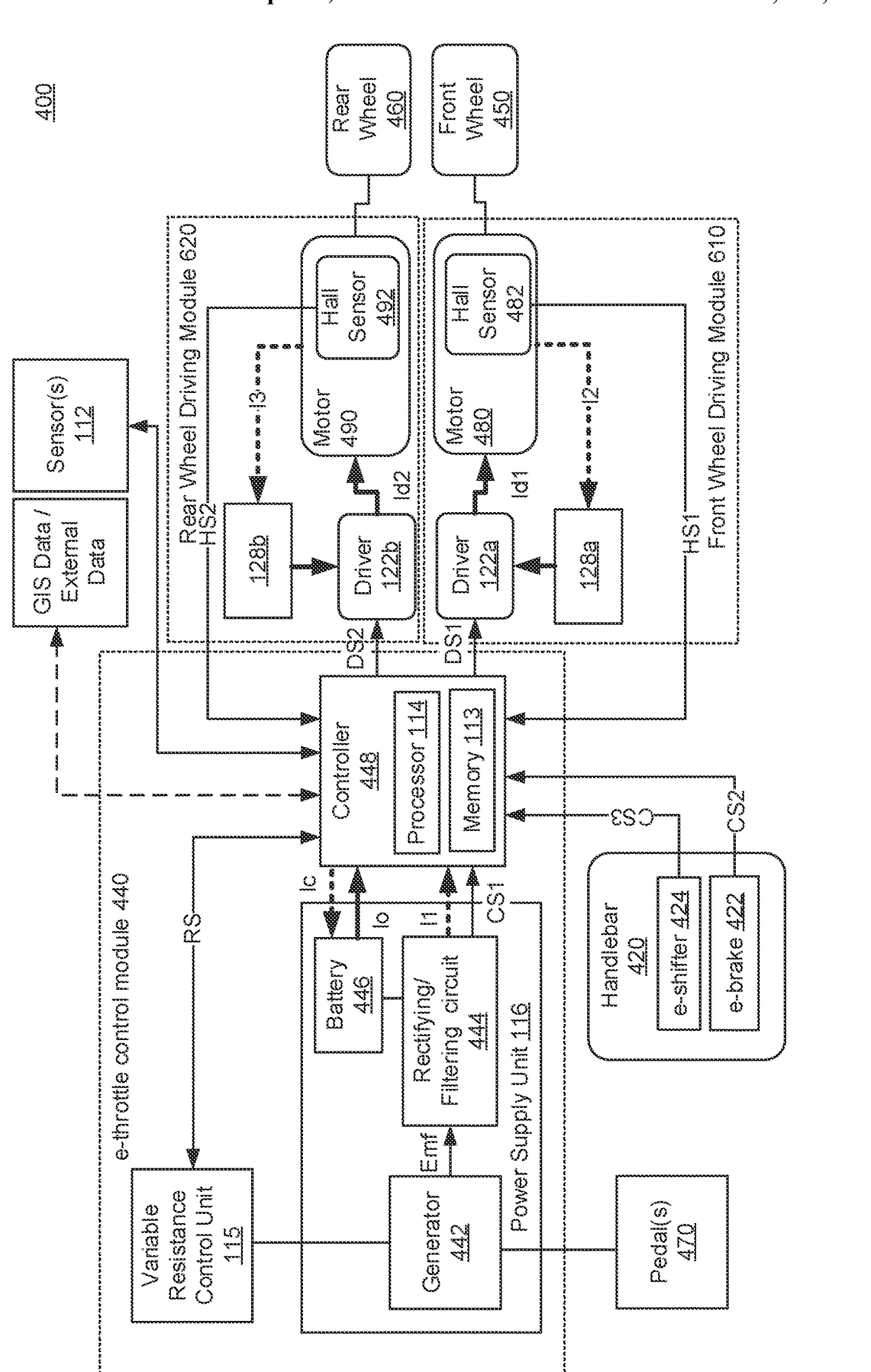
FIG. 6 is a block diagram illustrating the control of hub motors of the electric vehicle shown in FIG. 4, consistent with some other embodiments of the present disclosure.

FIG. 6 is a block diagram illustrating the control of hub motors 480 and 490 of electric vehicle 400 shown in FIG. 4, consistent with some other embodiments of the present disclosure. Compared to the embodiments of FIG. 5, electric vehicle 400 may include power supply units 128a and 128b. In some embodiments, power supply units 128a and 128b respectively include a rectifying/regulating circuit (e.g., a circuit including a rectifier, a DC filter, a DC/DC converter, a Pulse Width Modulation (PWM) controller, etc.) coupled with hub motors 480 and 490, and a power storage device (e.g., a battery) coupled with rectifying/regulating circuit. Driver 122a, power supply unit 128a, and hub motor 480 collectively form a driving module 610 for driving front wheel 450. On the other hand, driver 122b, power supply unit 128b, and hub motor 490 collectively form another driving module 620 for driving rear wheel 460.

It would be appreciated that, in some embodiments, only one of front wheel 450 or rear wheel 460 is controlled and driven electrically. Alternatively stated, in some embodiments, electric vehicle 400 may only include one of driving modules 610 or 620.

As shown in FIG. 6, during a downhill ride, the charging current I2 generated by hub motor 480 (which is used as a generator) can be fed back to power supply unit 128a to charge the power storage device(s) within power supply unit 128a. Thus, power supply unit 128a can be used to supply the electricity required by components within driving module 610, so that driver 122a can output driving current Id1 to drive hub motor 480 properly. Similarly, the charging current I3 generated by hub motor 490 during the downhill ride can also be fed back to power supply unit 128b to charge the power storage device(s) within power supply unit 128b, in order to supply the electricity required by components within driving module 620, so that driver 122b can output driving current Id2 to drive hub motor 490 properly.

On the other hand, the output current I1 generated by power generator 442 can be fed back to charge power storage device 446 within power supply unit 116, in order to supply the electricity required by components within e-throttle control module 440, including motor controller 448, so that motor controller 448 can perform its operations to output driving signals DS1 and DS2, and/or resistance command signal RS accordingly in response to the received command signals CS1, CS2, CS3, Hall sensor signals HS1, HS2, data from sensor(s) 112, GIS data or external data, or any combination thereof. In the embodiments shown in FIG. 6, driving signals DS1 and DS2 may be transmitted to corresponding driving modules 610 and 620 via wired or wireless communications.

In some embodiments, components within e-throttle control module 440, driving modules 610 and 620 illustrated in FIG. 5 and FIG. 6 may be located within proper part(s) of electric vehicle 400. For example, in some embodiments, variable resistance control unit 115, rectifying/regulating circuit 444, power storage device 446, motor controller 448, and/or drivers 122a, 122b may be located within the down tube portion or the seat tube portion of frame 410, but the present disclosure is not limited thereto.

In some embodiments, components within driving module 610 for driving front wheel 450 may be arranged within or adjacent to front wheel 450. For example, driver 122a and power supply unit 128a may be located within the hub or the wheel portion of the front wheel 450 or within space of the fork and head tube of frame 410. Similarly, components within driving module 620 for driving rear wheel 460 may be arranged within or adjacent to rear wheel 460. For example, driver 122b and power supply unit 128b may be located within the hub or the wheel portion of the rear wheel 460 or within space of the seat stay portion or the chain stay portion of frame 410. Communications between e-throttle control module 440 around pedal(s) 470 and driving modules 610 and 620 near front wheel 450 and rear wheel 460 can be achieved by various wireless communications mentioned above via the corresponding signal transmission circuit within each module (e.g., signal transmission circuits 111 and 126 illustrated in FIG. 2 and FIG. 3).

Figure 7:
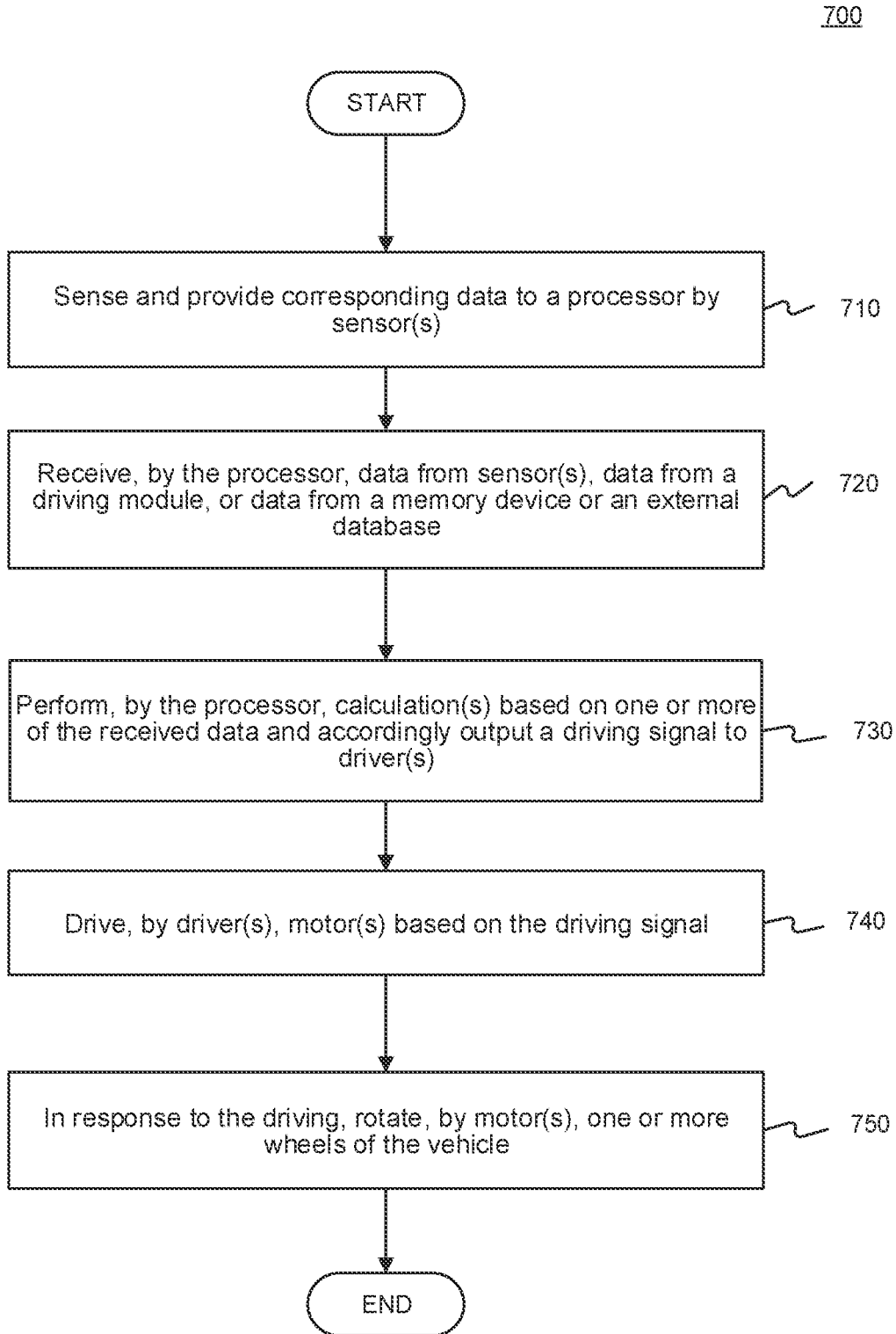
FIG. 7 is a flowchart illustrating an exemplary method for driving an electric vehicle, consistent with some embodiments of the present disclosure.

Reference is made to FIG. 7, which is a flowchart of an exemplary method 700 for driving a vehicle, consistent with some embodiments of the present disclosure. Method 700 can be performed by an electric bicycle (e.g., electric vehicle 100 in FIG. 1 or electric vehicle 400 in FIG. 4), but the present disclosure is not limited thereto. In some embodiments, processor 114 can be configured to execute instructions stored in memory device 113 to cause electric vehicle 100 or 400 to perform steps of method 700. Method 700 includes steps 710-750.

In step 710, sensor(s) 112 respectively sense and provide corresponding data to processor 114, in which the data contains information about the rider, the rider's movement, and/or other environmental factors.

In step 720, processor 114 receives data from sensor(s) 112, data from driving module 120, and/or data from memory device 113 or an external database. The received data may include information associated with the bike, the rider's physiological parameters, the rider's movement, and/or other environmental factors that affect the rider's cycling.

In step 730, processor 114 performs one or more calculations based on one or more of the received data and accordingly outputs a driving signal to driver(s) (e.g., driver 122, 122a, and/or 122b). For example, in some embodiments, the driving signal is outputted according to a pedaling command signal (e.g., signal CS1 in FIGS. 5-6) associated with a back emf signal (e.g., signal Emf in FIGS. 5-6) generated by a generator (e.g., power generator 442 in FIGS. 5-6) coupled to one or more pedals (e.g., pedal(s) 470 in FIGS. 5-6) of the vehicle.

In some embodiments, the driving signal is further outputted according to a braking signal (e.g., signal CS2 in FIGS. 5-6) from a brake control (e.g., e-brake 422 in FIGS. 5-6). In some embodiments, the driving signal is further outputted according to a shifting signal (e.g., signal CS3 in FIGS. 5-6) from a shifter (e.g., e-brake 422 in FIGS. 5-6).

In some embodiments, in step 730, in addition to the driving signal, processor 114 also performs one or more calculations and outputs a resistance command signal (e.g., signal RS in FIGS. 5-6) to a variable resistance control unit (e.g., variable resistance control unit 115 in FIGS. 5-6) to adjust a pedaling resistance level of the vehicle. For example, the resistance command signal may be associated with the shifting signal from the shifter, or associated with the current slope or grade.

In step 740, driver(s) (e.g., driver 122, 122a, or 122b) drive motor(s) (e.g., motor 124, hub motors 480 and/or 490) based on the driving signal from processor 114.

In step 750, in response to the driving of driver(s), motor(s) drive rear wheel (e.g., rear wheel 130 in FIG. 1 or rear wheel 460 in FIG. 4) and/or front wheel (e.g., front wheel 140 in FIG. 1 or front wheel 450 in FIG. 4) at a controlled angular velocity corresponding to the driving signal.

By applying method 700 for driving a vehicle (e.g., electric vehicle 100 in FIGS. 1-3 or electric vehicle 400 in FIGS. 4-6) described in above embodiments, actuating module 110 (or e-throttle control module 440) can adjust and tune the operation of driving module 120 (or driving modules 610, 620) based on integrated data obtained from various internal or external sensors, data from memory device 113 or other storage devices in electric vehicle 100 or 400, and/or data from a cloud database that is accessible via wireless communications. Therefore, electric vehicles 100 or 400 can provide an optimized riding efficiency, mechanical efficiency, and/or biomechanical efficiency.

In addition, electric vehicles 100 or 400 can also improve the comfortableness of the rider by providing customized adjustments. Furthermore, in some embodiments, some components for transferring mechanical power (e.g., chain, freewheel, derailleur, etc.) are removed from electric vehicle 100 or 400, which provides more freedom and flexibility in the design of bicycles. Alternatively stated, in some embodiments, electric vehicles 100 and 400 can be chainless electric bicycles.

The various example embodiments described herein are described in the general context of method steps or processes, which may be implemented in one aspect by a computer program product, embodied in a transitory or a non-transitory computer-readable medium, including computer-executable instructions, such as program code. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Generally, program modules may include routines, programs, objects, components, data structures, etc. those perform particular tasks or implement particular abstract data types. Computer-executable instructions, associated data structures, and program modules represent examples of program code for executing steps of the methods disclosed herein. The computer-readable medium may store a set of instructions executable by one or more processors of the vehicle to initiate the method for driving the vehicle described above. The particular sequence of such executable instructions or associated data structures represents examples of corresponding acts for implementing the functions described in such steps or processes.

As used herein, the term "or" encompasses all possible combinations, except where infeasible. For example, if it is stated that a device, structure, or module may include A or B, then, unless specifically stated otherwise or infeasible, the device, structure, or module may include A, or B, or A and B. As a second example, if it is stated that a device, structure, or module may include A, B, or C, then, unless specifically stated otherwise or infeasible, it may include A, or B, or C, or A and B, or A and C, or B and C, or A and B and C.

The embodiments may further be described using the following clauses:

1. An electric vehicle, comprising:
a frame;
at least one front wheel coupled to the frame;
at least one rear wheel coupled to the frame;
one or more pedals coupled to the frame and configured for a user's engagement with the electric vehicle via pedaling;
a controller configured to output one or more driving signals in response to a pedaling motion of the one or more pedals;
a first motor coupled to one of the at least one front wheel or the at least one rear wheel and configured to drive the one of the at least one front wheel or the at least one rear wheel; and
a first driver coupled with the first motor and configured to adjust the first driver's power output to the first motor in response to the one or more driving signals.

2. The electric vehicle of clause 1, further comprising:
a second motor coupled to the other one of the at least one front wheel or the at least one rear wheel and configured to drive the other one of the at least one front wheel or the at least one rear wheel; and
a second driver coupled with the second motor and configured to adjust the second driver's power output to the second motor in response to the one or more driving signals.

3. The electric vehicle of clause 1 or clause 2, further comprising:
a handlebar coupled to the frame, the handlebar comprising a brake control, wherein the controller is further configured to output the one or more driving signals in response to a braking signal from the brake control.

4. The electric vehicle of any of clauses 1-3, further comprising:
a handlebar coupled to the frame, the handlebar comprising a shifter, wherein the controller is further configured to output the one or more driving signals in response to a shifting signal from the shifter.

5. The electric vehicle of any of clauses 1-4, wherein the first motor comprises:
a hall sensor configured to detect a rotation angle of the first motor and output a hall sensor signal to the controller.

6. The electric vehicle of any of clauses 1-5, further comprising:
one or more sensors coupled to the controller,
wherein the controller is further configured to output the one or more driving signals in response to a riding data detected by the one or more sensors.

7. The electric vehicle of clause 6, wherein the riding data comprises an air resistance, a wind resistance, a weight of the user, a weight of the electric vehicle, a current slope or grade, feet position of the user on the one or more pedals, a pedaling rate, an effective pedaling power, a bike speed, a battery level or battery health level, or any combination thereof 8. The electric vehicle of any of clauses 1-7, further comprising:
a first power supply unit coupled to the controller, the first power supply unit comprising:
    a generator coupled to the one or more pedals and configured to generate a back emf signal;

a rectifying circuit coupled to the generator and configured to output a pedaling command signal associated with the back emf signal to the controller; and
    a first power storage device coupled to the controller and configured to provide an output current to the controller.

9. The electric vehicle of clause 8, further comprising:
a second power supply unit coupled to the first driver and configured to provide an output current to the first driver.

10. The electric vehicle of any of clauses 1-9, further comprising:
a variable resistance control unit configured to provide a plurality of pedaling resistance levels in response to a resistance command signal from the controller.

11. A method for driving a vehicle, comprising:
sensing, by one or more sensors of the vehicle, data containing information of a rider, a rider's movement, or one or more environmental factors affecting the rider's cycling;
receiving, by a processor, the data from the one or more sensors, the data from a driving module of the vehicle, or the data from a memory device of the vehicle or an external database;
performing, by the processor, one or more calculations based on one or more of the received data and accordingly outputting a driving signal to one or more drivers;
driving, by the one or more drivers, one or more motors based on the driving signal from the processor; and
in response to the driving of the one or more drivers, rotating at least one rear wheel or at least one front wheel, by the one or more motors, at a controlled angular velocity corresponding to the driving signal.

12. The method of clause 11, wherein outputting the driving signal comprises:
outputting the driving signal according to a pedaling command signal associated with a back emf signal generated by a generator coupled to one or more pedals of the vehicle.

13. The method of clause 11 or clause 12, wherein outputting the driving signal comprises:
outputting the driving signal according to a braking signal from a brake control.

14. The method of any of clauses 11-13, wherein outputting the driving signal comprises:
outputting the driving signal according to a shifting signal from a shifter.

15. The method of clause 14, further comprising:
outputting a resistance command signal to a variable resistance control unit to adjust a pedaling resistance level of the vehicle.

16. A non-transitory computer-readable medium that stores a set of instructions executable by a processor of a vehicle to initiate a method for driving the vehicle, the method comprising:
receiving data from one or more sensors, data from a driving module of the vehicle, or data from a memory device of the vehicle or an external database, the data containing information of a rider, a rider's movement, or one or more environmental factors affecting the rider's cycling;
performing one or more calculations based on one or more of the received data and accordingly outputting a driving signal to one or more drivers; and
driving one or more motors based on the driving signal from the processor, in which at least one rear wheel or at least one front wheel of the vehicle is rotated by the one or more motors, at a controlled angular velocity corresponding to the driving signal in response to the driving of the one or more drivers.

17. The non-transitory computer-readable medium of clause 16, wherein the set of instructions is executable by the processor to output the driving signal by:

outputting the driving signal according to a pedaling command signal associated with a back emf signal generated by a generator coupled to one or more pedals of the vehicle.

18. The non-transitory computer-readable medium of clause 16 or clause 17, wherein the set of instructions is executable by the processor to output the driving signal by:

outputting the driving signal according to a braking signal from a brake control.

19. The non-transitory computer-readable medium of any of clauses 16-18, wherein the set of instructions is executable by the processor to output the driving signal by:

outputting the driving signal according to a shifting signal from a shifter.

20. The non-transitory computer-readable medium of clause 19, wherein the set of instructions is executable by the processor to further perform:

outputting a resistance command signal to a variable resistance control unit to adjust a pedaling resistance level of the vehicle.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. An electric vehicle, comprising:
a frame;
at least one front wheel coupled to the frame;
at least one rear wheel coupled to the frame;
one or more pedals coupled to the frame and configured for a user's engagement with the electric vehicle via pedaling;
a controller configured to output one or more driving signals according to a pedaling command signal associated with a back EMF (electromotive force) signal in response to a pedaling motion of the one or more pedals;
a first power supply unit coupled to the controller, the first power supply unit comprising:
a power generator coupled to the one or more pedals and configured to generate the back EMF signal; and
a rectifying circuit coupled to the power generator and configured to receive the back EMF signal from the power generator and output the pedaling command signal associated with the back EMF signal to the controller, and further configured to rectify a charging current generated in response to the back EMF signal being induced by the pedaling motion and provide the rectified charging current to the controller for charging a first power storage device of the first power supply unit;
a first motor coupled to one of the at least one front wheel or the at least one rear wheel and configured to drive the one of the at least one front wheel or the at least one rear wheel; and
a first driver coupled with the first motor and configured to adjust the first driver's power output to the first motor in response to the one or more driving signals.

2. The electric vehicle of claim 1, further comprising:
a second motor coupled to the other one of the at least one front wheel or the at least one rear wheel and configured to drive the other one of the at least one front wheel or the at least one rear wheel; and
a second driver coupled with the second motor and configured to adjust the second driver's power output to the second motor in response to the one or more driving signals.

3. The electric vehicle of claim 1, further comprising:
a handlebar coupled to the frame, the handlebar comprising a brake control, wherein the controller is further configured to output the one or more driving signals in response to a braking signal from the brake control.

4. The electric vehicle of claim 1, further comprising:
a handlebar coupled to the frame, the handlebar comprising a shifter, wherein the controller is further configured to output the one or more driving signals in response to a shifting signal from the shifter.

5. The electric vehicle of claim 1, wherein the first motor comprises:
a hall sensor configured to detect a rotation angle of the first motor and output a hall sensor signal to the controller.

6. The electric vehicle of claim 1, further comprising:
one or more sensors coupled to the controller,
wherein the controller is further configured to output the one or more driving signals in response to a riding data detected by the one or more sensors.

7. The electric vehicle of claim 6, wherein the riding data comprises an air resistance, a wind resistance, a weight of the user, a weight of the electric vehicle, a current slope or grade, feet position of the user on the one or more pedals, a pedaling rate, an effective pedaling power, a bike speed, a battery level or battery health level, or any combination thereof.

8. The electric vehicle of claim 1, wherein:
the first power storage device is coupled to the controller and configured to provide an output current to the controller.

9. The electric vehicle of claim 8, further comprising:
a second power supply unit coupled to the first driver and configured to provide an output current to the first driver.

10. The electric vehicle of claim 1, further comprising:
a variable resistance control unit configured to provide a plurality of pedaling resistance levels in response to a resistance command signal from the controller.

* * * * *